United States Patent
Suganuma et al.

(10) Patent No.: US 7,445,862 B2
(45) Date of Patent: Nov. 4, 2008

(54) SOLID OXIDE FUEL CELL DEVICE

(75) Inventors: Shigeaki Suganuma, Nagano (JP); Yasue Tokutake, Nagano (JP); Michio Horiuchi, Nagano (JP); Misa Watanabe, Chandler, AZ (US)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 395 days.

(21) Appl. No.: 11/346,059

(22) Filed: Feb. 2, 2006

(65) Prior Publication Data

US 2006/0204805 A1  Sep. 14, 2006

(30) Foreign Application Priority Data

Mar. 11, 2005 (JP) .............................. 2005-069373

(51) Int. Cl.
*H01M 8/10* (2006.01)
*H01M 8/12* (2006.01)

(52) U.S. Cl. ........................................................ 429/30

(58) Field of Classification Search ................... 429/26, 429/30, 20

See application file for complete search history.

(56) References Cited

U.S. PATENT DOCUMENTS 6,358,640 B1 *  3/2002  Kendall et al. ................. 429/26
2004/0086761 A1  5/2004  Horiuchi et al.

FOREIGN PATENT DOCUMENTS

JP  06-196176  7/1994

* cited by examiner

*Primary Examiner*—Patrick Ryan
*Assistant Examiner*—Thomas H. Parsons
(74) *Attorney, Agent, or Firm*—Rankin, Hill & Clark LLP

(57) ABSTRACT

A solid oxide fuel cell C including a solid oxide fuel cell having a planar solid oxide substrate, a cathode electrode layer formed on one surface of the substrate, and an anode electrode layer formed on a surface opposite the one surface, is disposed so that the anode electrode layer opposes a catalytically-oxidizing member 13 of a heating appliance. Fuel supplied from a fuel storage container 10 is subjected to flameless combustion in the catalytically-oxidizing member by catalytic oxidation. The heat is conducted to the fuel cell C from the catalytically-oxidizing member, thereby maintaining the fuel cell at its operating temperature. Simultaneously, produced oxidation fuel components of the fuel are supplied to the anode electrode layer; and air is supplied to the cathode electrode layer. Hence, the fuel cell generates electric power.

6 Claims, 3 Drawing Sheets

SOLID OXIDE FUEL CELL DEVICE

This application claims foreign priority based on Japanese Patent application No. 2005-69373, filed Mar. 11, 2005, the contents of which is incorporated herein by reference in its entirety.

BACKGROUND OF THE INVENTION

1. Field of the Invention

The present invention relates to a solid oxide fuel cell device. More particularly, the invention relates to a solid oxide fuel cell device which has a solid oxide fuel cell aiming at miniaturization and reduction in profile by employment of a simple structure which does not require sealing, and in which a cathode electrode layer (hereinafter called a "cathode layer") and an anode electrode layer (hereinafter called an "anode layer") are formed on a solid oxide substrate; which can generate electric power through utilization of flameless combustion based on catalytic oxidation of fuel, and which is convenient in handling, including carriage on the road and transport.

2. Description of the Related Art

Conventionally, fuel cell devices have been developed and put into practice as low-pollution electric power generation means to replace thermal power generation, or the like; or as an electric power source for electric vehicles, that replaces internal combustion engines whose fuel is gasoline, or the like. Furthermore, an attempt has been made to utilize the fuel cell device as a power source of a personal computer, and the like. A number of studies on the fuel cell have been conducted with an aim of increasing efficiency and attaining cost reduction.

Fuel cell devices employ various power generation types. These power generation types include a fuel cell device employing a solid electrolyte. An example of this fuel cell device employs a fired member, which is made of fully stabilized zirconia doped with yttria ($Y_2O_3$), as an oxygen-ion-conducting solid oxide substrate. A cathode layer is formed on one surface of the solid oxide substrate, and an anode layer is formed on the opposite surface thereof. The fuel cell is configured such that oxygen or an oxygen-containing gas is supplied to the cathode layer side, and a fuel gas, such as methane, is supplied to the anode layer side.

In this fuel cell device, oxygen ($O_2$) supplied to the cathode layer is ionized into oxygen ions ($O^{2-}$) at the boundary between the cathode layer and the solid oxide substrate. The oxygen ions are conducted through the solid oxide substrate into the anode layer, where the ions react with the gas, such as methane ($CH_4$), having been supplied to the anode layer, thereby producing water ($H_2O$), carbon dioxide ($CO_2$), hydrogen ($H_2$), and carbon monoxide (CO). Through this reaction, the oxygen ions emit electrons. As a result, a potential difference arises between the cathode layer and the anode layer. Hence, when a lead wire is connected to the cathode layer and to the anode layer, electrons in the anode layer flow into the cathode layer side via the lead wire, whereby the fuel cell generates electric power. Meanwhile, the operating temperature of the fuel cell device is approximately 1,000° C.

However, this type of fuel cell device must be provided with separate chambers, one being an oxygen or oxygen-containing gas supply chamber on the cathode layer side, and the other being a fuel gas supply chamber on the anode layer side. Furthermore, since the fuel cell device is to be exposed to an oxidizing atmosphere and to a reducing atmosphere at high temperatures, enhancement of durability of the fuel cell has encountered difficulty.

Meanwhile, a fuel cell device of the following type has been developed. A cathode layer and an anode layer are disposed on opposing surfaces of a solid oxide substrate; and an electromotive force is generated between the cathode layer and the anode layer by means of placing the fuel cell in a mixed fuel gas in which, e.g., methane gas and oxygen gas are mixed. The principle of electromotive force generation between the cathode layer and the anode layer for this type of fuel cell device is the same as that for the foregoing separate chamber fuel cell device. However, since the entire fuel cell can be brought into substantially a single atmosphere, the fuel cell device can be configured as a single-chamber type to which a mixed fuel gas is supplied, thereby enhancing the durability of the fuel cell.

However, in view that even the single-chamber fuel cell device must be operated at high temperatures of approximately 1,000° C., there arises a risk of explosion of the mixed fuel gas. Here, if the oxygen concentration is reduced to a level lower than the ignitability limit in an attempt to avoid the risk, there arises the problem that carbonization of the fuel, such as methane, progresses and the cell exhibits degraded performance. To this end, there has been developed a single-chamber fuel cell device which can utilize a mixed fuel gas of an oxygen concentration level at which progress of carbonization of the fuel can be prevented while explosion of the mixed fuel gas is also prevented.

The foregoing fuel cell device is a type which comprises a fuel cell housed in a chamber having a sealing structure. Meanwhile, there has been proposed a system having a configuration in which a solid oxide fuel cell is disposed in a flame or in the vicinity thereof, thereby maintaining the solid oxide fuel cell at its operating temperature by the heat of the flame, to thus generate electric power such as disclosed in Japanese unexamined patent Hei 6-196176. The configuration of this electric power generation system is illustrated in FIG. 4.

A fuel cell of the electric power generation system illustrated in FIG. 4 comprises a tubular member formed from a solid oxide substrate 1 of zirconia; a cathode layer 2 which is formed on an inner side of the tubular member and which serves as an air electrode; and an anode layer 3 which is formed on an outer side of the tubular member and which serves as a fuel electrode. The solid oxide fuel cell with the solid electrolyte is disposed in a state of exposing the anode layer 3 to a reducing flame portion of a flame "f" which is given from a combustion unit 4 to which fuel gas is supplied. When this arrangement is adopted, radical components, and the like, present in the reducing flame can be utilized as fuel; and air is supplied to the cathode layer 2 inside the tubular member by means of convection or diffusion. As a result, the cell generates electric power as a solid oxide fuel cell.

Meanwhile, in contrast to the related-art solid oxide fuel cell devices, the foregoing single-chamber fuel cell device obviates the need of strict separation between the fuel and the air. However, the single-chamber fuel cell device inevitably employs a hermetically-sealed structure. In addition, the electromotive force is increased by means of stacking a plurality of planar solid oxide fuel cells with use of an interconnect material having thermal resistance and high electrical conductivity, thereby enabling operation at high temperature. As a result, the single-chamber fuel cell device employing the planar solid oxide fuel cells has a large-scale configuration, thereby posing a problem of being costly.

In addition, in actuation of the single-chamber fuel cell device, temperature is gradually raised to a high level, thereby preventing cracking of the solid electrolyte fuel cell. Accordingly, this type of fuel cell device requires a long time until power generation is started, and requires a lot of labor in operation.

In contrast, the tubular solid electrolyte fuel cell illustrated in FIG. 4 adopts a mode of directly utilizing a flame. Accordingly, this type of fuel cell device is characterized by being an open type, and not requiring housing in a hermetically-sealed container. Thus, by virtue of shortening a period of time required for starting power generation and having a simple structure, this fuel cell device can be advantageous in terms of miniaturization, weight reduction, and cost reduction. Since the device utilizes a flame directly, the fuel cell device can be incorporated in a general combustion apparatus or an incinerator. Therefore, the device is expected to be utilized as an electric power supply device.

However, in this type of fuel cell device, since the anode layer is formed on the outer surface of the tubular solid oxide substrate, radical components produced by means of the flame are not primarily supplied to a lower half of the anode layer. Thus, utilization of the entire surface of the anode layer formed on the outer surface of the tubular solid oxide substrate is inhibited. Therefore, electrical generation efficiency has been low. Furthermore, since the solid oxide fuel cell is heated directly by a flame and unevenly, there arises a problem that cracks are easily produced by rapid temperature changes.

To this end, there has been proposed an electric power generation system which adopts a solid oxide fuel cell device of a type directly utilizing a flame produced by combustion of fuel. The solid oxide fuel cell device serves as convenient electric power supply means, which is configured such that a flame exposes the entire surface of an anode layer formed on a planar solid oxide substrate, thereby attaining enhancement in durability, enhancement in electric power generation efficiency, miniaturization, and cost reduction such as disclosed in US 2004/0086761 A1.

An electric power generation system which adopts the proposed solid oxide fuel cell device is illustrated in FIG. 5. In FIG. 5, elements identical with those of the electric power generation system illustrated in FIG. 4 are assigned the same reference numerals. A solid oxide fuel cell C employed in the electric power generation system comprises a solid oxide substrate 1 which is formed into a flat planar shape; a cathode layer 2 formed on one surface of the substrate; and an anode layer 3 formed on the surface opposite the one surface. The cathode layer 2 and the anode layer 3 are disposed so as to oppose each other across the solid oxide substrate 1.

An electric power generation system is formed with use of the thus-configured solid oxide fuel cell C. The cell C is disposed above the combustion unit 4, to which fuel gas is to be supplied, with the anode layer 3 of the fuel cell C facing downward, thereby exposing the anode layer 3 to the flame "f" produced by the fuel, to thus generate electric power. The combustion unit 4 is supplied with fuel to be combusted and oxidized while producing a flame. Phosphorus, sulfur, fluorine, chlorine, and compounds thereof may also be used as the fuel. However, organic substances requiring no waste gas treatment are preferably used. Examples of such organic fuels include gases, such as methane, ethane, propane, and butane; gasoline-based liquids, such as hexane, heptane, and octane; alcohols, such as methanol, ethanol, and propanol; ketones, such as acetone; various other organic solvents; food oil; kerosene; paper; and wood. Among them, the gases are particularly preferable.

The flame may be a diffusion flame or a premixed flame. However, since the diffusion flame is unstable, and is likely to incur degradation of the function of the anode layer due to production of soot, the premixed flame is more preferable. The premixed flame is stable, and, in addition, easy in adjustment of flame size. Furthermore, production of soot by the premixed flame can be prevented by means of adjusting the fuel concentration.

Since the solid oxide fuel cell is formed into a flat planar shape, the flame "f" given from the combustion unit 4 can be directed uniformly on the anode layer 3 of the solid oxide fuel cell C, thereby attaining uniform application of the flame "f" as compared with the solid oxide cell of a tubular shape. Furthermore, since the anode layer 3 is disposed facing the flame "f" side, hydrocarbons, hydrogen, carbon monoxide, radicals (OH, CH, $C_2$, $O_2H$, $CH_3$), and the like present in the flame can be readily utilized as fuel for electric power generation on the basis of oxidation reduction reactions. In addition, since the cathode layer 2 is exposed to an oxygen-containing gas, such as air, the cathode layer 2 can readily utilize oxygen. Furthermore, when the oxygen-containing gas is blown toward the cathode layer 2, the cathode layer side can be brought into an oxygen-rich state more efficiently.

The electric power generated by the solid oxide fuel cell C is extracted via a lead wire L1 extending from the cathode layer 2 and a lead wire L2 extending from the cathode layer 3. As the lead wires L1 and L2, wires made of platinum or a platinum-containing alloy, which are heat-resistant, are employed.

As described above, a proposed electric power generation system of chamber type requires an electric furnace for raising the temperature of a solid oxide fuel cell to an operating temperature, a supply unit for supplying a fuel gas, and oxygen or air, and the like; hence, the system itself becomes complicated and voluminous. Accordingly, the chamber-type system cannot be carried by a person as an electric power generation system.

In contrast, the electric power generation system proposed herein and adopting a solid oxide fuel cell—which utilizes a flame directly—requires a combustion unit for combusting fuel and producing a flame. For instance, by employing a flame of a candle, cigarette lighter as the combustion unit, a compact electric power generation system which is small and lightweight can be realized. However, since utilizing a flame is required for providing high temperature enough for the solid oxide fuel cell to generate electric power, the power generation system itself encounters difficulty in practical usage. That is, because of the flame being not stabilized during the system being carried outside or being used under mobile condition, which ends up an unstable operation of the electric power generation.

SUMMARY OF THE INVENTION

To this end, the present invention aims at providing a solid oxide fuel cell device by employing a flameless combustion system which is small and lightweight, and can generate electric power not only while the device is operated at the stable place but also while it is operated with being carried outside or using it under the mobile condition although the flameless combustion has been believed to be not practically used for the solid oxide fuel cell because of its low heat amount. Therefore, the present invention achieves a flameless combustion system by scrutinizing the structure of the solid oxide fuel cell, and enables a stable fuel supply at the time of generating electric power without limiting the place in use of a solid oxide fuel cell.

To solve the above problem, the present invention provides a solid oxide fuel cell device including a solid oxide fuel cell having a planar solid oxide substrate, a cathode electrode layer formed on a first surface of the substrate, and an anode electrode layer formed on a second surface of the substrate opposite to the first surface thereof; and a catalytically-oxidizing member which is disposed below the solid oxide fuel cell, and to which fuel is to be supplied. The solid oxide fuel cell device is thus configured so as to generate electric power by supplying an oxidation fuel component to the anode electrode layer, said oxidation fuel component being produced from the fuel through the catalytically-oxidizing member, and supplying an air to the cathode electrode layer.

Further, said solid oxide fuel cell is disposed to have a gap from the catalytically-oxidizing member. As to the catalytically-oxidizing member, it is provided at an exit of fuel of a fuel storage container in a heating appliance, and is employed as the heat source of the heating appliance.

In this invention, the fuel to be supplied to the catalytically-oxidizing member is organic liquid or organic gas accumulated in the fuel storage container. More specifically, the organic liquid is, in particular, any of benzine, ethanol, and white kerosene.

In this invention, the solid oxide fuel cell has a plurality of cathode electrode layers formed on the one surface of the solid oxide substrate, and a plurality of anode electrode layers formed on the opposite surface of the solid oxide substrate. A plurality of fuel cells are formed from the anode electrode layers and the cathode electrode layers which oppose each other across the solid oxide substrate.

As described above, the solid oxide fuel cell device according to the invention employs a solid oxide fuel cell including a planar solid oxide substrate, a cathode electrode layer, and an anode electrode layer; and is configured so as to generate electric power on the basis of the anode electrode layer being supplied with an oxidation fuel component of fuel produced on the catalytically-oxidizing member; and the cathode electrode layer being supplied with air. Therefore, heat can be produced by flameless combustion based on catalytic oxidation of the fuel without a flame produced by combustion of the fuel; and the heat can maintain the solid oxide fuel cell at an operating temperature. In addition, partial oxidation fuel components produced by flameless combustion based on the catalytic oxidation of the fuel can be used as fuel of the fuel cell device.

Hence, when the solid oxide fuel cell is incorporated in a heating appliance whose heat source is flameless combustion based on catalytic oxidation, the appliance can be configured small, lightweight, and compact. In addition, the appliance is conveniently portable, and can continue to generate electric power stably even while the appliance is carried on the road or while on the move.

DESCRIPTION OF THE PREFERRED EMBODIMENTS

Embodiments of the present invention will be described hereinbelow by reference to the drawings. Unless otherwise specifically defined in the specification, terms have their ordinary meaning as would be understood by those of ordinary skill in the art.

Next, embodiments of a solid oxide fuel cell device according to the invention will be described by reference to FIGS. 1 to 3. A solid oxide fuel cell which can be used in the solid oxide fuel cell device of the present embodiment will now be described.

Figure 5:
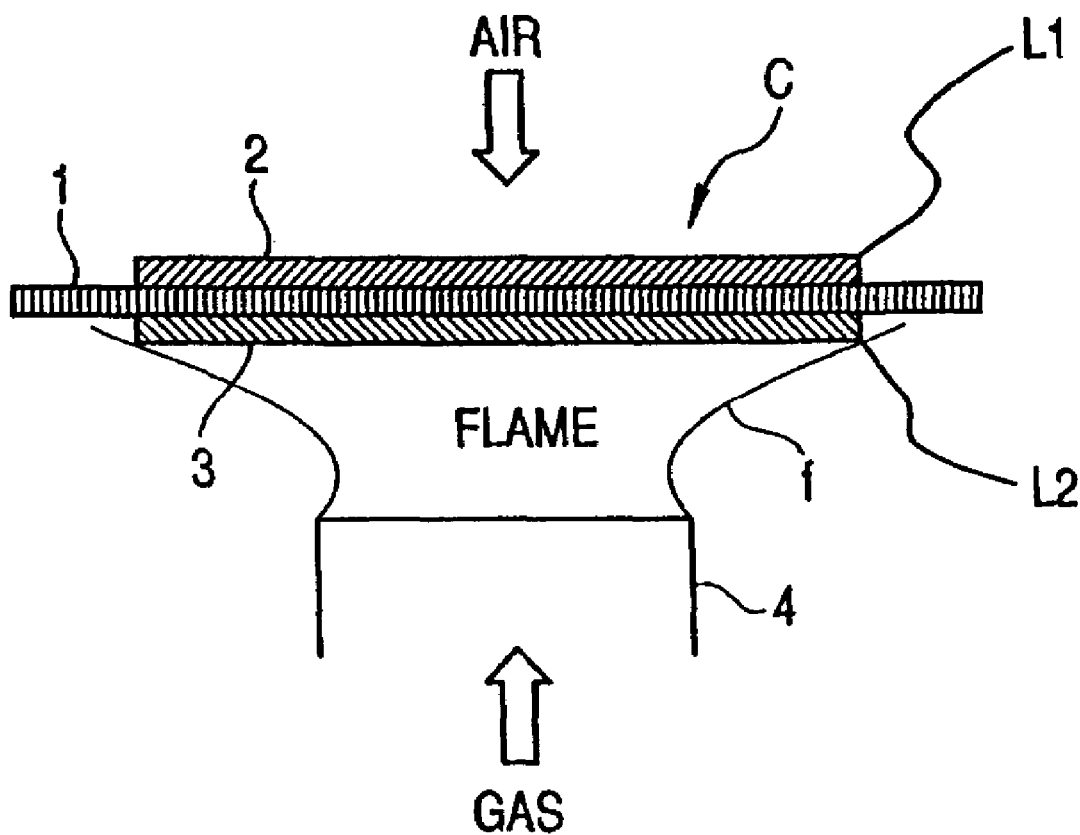
FIG. 5 is a view describing a configuration of a flat planar solid oxide fuel cell device which uses a flame according to the related art.

The solid oxide fuel cell used in the present embodiment has basically the same configuration as that of the solid oxide fuel cell C illustrated in FIG. 5, comprising the solid oxide substrate 1, the cathode layer 2, and the anode layer 3.

However, because of employing a flameless combustion system in this invention, it is necessary for scrutinizing the designs of the solid oxide fuel cell so as to be adaptable for the catalytically-oxidizing member of which amount of heat is not enough high for operating the conventional type of solid oxide fuel cell.

The solid oxide substrate 1 is, e.g., a rectangular flat plate. The cathode layer 2 and the anode layer 3 are formed over approximately the entirety of each of the flat faces of the substrate 1 so as to oppose each other across the solid oxide substrate 1. The lead wire L1 is connected to the cathode layer 2, and the lead wire L2 is connected to the anode layer 3. Output from the fuel cell is extracted via the lead wires L1 and L2. Meanwhile, an essential requirement for the solid oxide substrate 1 is to be formed into a planar shape, which is not limited to a rectangular shape. For instance, the substrate 1 can be modified into a size appropriate for being incorporated so as to oppose a combustion section of a heating appliance, and may be of an arbitrary shape.

However, as already mentioned above, it is noted that the catalytically-oxidizing member provides low amount of heat to the cell, therefore it is required to design the cell structure in a way such that the provided heat amount is propagated efficiently to the whole of the cell. Specifically, since the cathode electrode is exposed to the air atmosphere, the temperature becomes lower than the that of the anode electrode. Concerning such a condition, the cell size is designed to be made thinner with striking a balance of durability of the cell so that the heat at the anode electrode side can be propagated over the cathode electrode side.

To this end, generation of electric power can be achieved without spoiling its durability of the cell by forming each thickness of the cathode electrode and the anode electrode in a range from 0.1 mm to 0.3 mm, and forming that of the solid oxide substrate in a range from 0.1 mm to 0.3 mm.

For the solid oxide substrate 1, e.g., a known material can be employed. Examples of the material include the following:

a) YSZ (yttria-stabilized zirconia), ScSZ (scandia-stabilized zirconia), and zirconia-based ceramics formed by means of doping either of these materials with Ce, Al, or the like;

b) Ceria-based ceramics, such as SDC (samaria-doped ceria) or GDC (gadolinia-doped ceria); and c) LSGM (lanthanum gallate) and bismuth oxide-based ceramics.

For the anode layer 3, e.g., a known material can be employed. Examples of the material include the following:

d) Cermets of nickel, and a yttria-stabilized zirconia-based ceramic, a scandia-stabilized zirconia-based ceramic, or a ceria (SDC, GDC, YDC, or the like)-based ceramic;

e) Sintered materials having an electrically-conductive oxide as a main component (with a content of 50 to 99% by weight) (examples of the electrically-conductive oxide include nickel oxide in which lithium is dissolved); and f) Materials obtained by adding a metal of a platinum-group metal element or an oxide thereof in an amount of 1 to 10% by weight to one of the materials listed in d) and e). Among the above, the materials listed in d) and e) are particularly preferable.

More specifically, the sintered materials having the electrically-conductive oxide in e) as the main component exhibit excellent oxidation resistance. Therefore, the materials can prevent problematic phenomena, such as reduction of power generation efficiency resulting from an increase in the electrode resistance of the anode layer, inability to generate electric power, or exfoliation of the anode layer from the solid oxide substrate. As the electrically-conductive oxide, a nickel oxide in which lithium is dissolved is preferably employed. In addition, high electric power generation performance can be obtained by means of adding a metal of a platinum-group metal element or an oxide thereof to one of the materials listed in d) or e).

For the cathode layer 2, a known material can be employed. Examples of the material include: manganese oxide from an element of Group III of the periodic table, such as lanthanum to which strontium (Sr) is added (e.g., lanthanum strontium manganite); cobalt oxide compound to which the same is added (e.g., samarium strontium cobaltite)

Both the cathode layer 2 and the anode layer 3 are formed so as to have a porous structure. These electrode layers are formed such that the porosity of the porous structure is 20% or higher, preferably within the range of 30 to 70%, particularly preferably within the range of 40 to 50%. By virtue of employment of the cathode layer 2 and the anode layer 3 which are formed into the porous structure, in the solid oxide fuel cell used in the present embodiment, oxygen in the air is readily supplied to the entire boundary surface between the solid oxide substrate 1 and the cathode layer 2; and the fuel is readily supplied to the entire boundary surface between the solid oxide substrate 1 and the anode layer 3.

The solid oxide substrate 1 can also be formed so as to have a porous structure. In a case of being formed into a close-compacted structure, the solid oxide substrate is low in thermal shock resistance, and cracks are readily produced by rapid temperature changes. In addition, generally, a solid oxide substrate is formed thicker than an anode layer and a cathode layer. Therefore, in some cases, cracks in the solid oxide substrate trigger development of cracks in the entire solid oxide fuel cell, and disintegrate the same into pieces.

When the solid oxide substrate 1 is formed into a porous structure, no cracking occurs even when the substrate 1 is subjected to rapid temperature changes, or to a heat cycle at which the temperature changes by a significant extent. Thus, the substrate 1 is enhanced in thermal shock resistance. Further, even when the solid oxide substrate 1 had a porous structure, when the porosity is less than 10%, no appreciable improvement is observed in thermal shock resistance. In contrast, when the porosity is 10% or higher, favorable shock resistance is observed; and a further favorable result is observed when the porosity is 20% or higher. The supposed reason for this is that, when the solid electrolyte layer has a porous structure, pores absorb the thermal expansion caused by heating.

The solid oxide fuel cell C is manufactured, e.g., in the following manner. First, powders of materials for forming the solid oxide substrate are mixed in predetermined proportions; and the mixture is formed into a flat planar shape. Subsequently, the flat planar member is fired and sintered, thereby obtaining a substrate serving as the solid oxide layer. At this time, solid oxide substrates of various porosities can be obtained by means of adjusting the types and proportions of the powder materials, such as a pore-forming agent; and firing conditions, such as the firing temperature, firing time, and preliminary firing. A paste for forming the cathode layer is applied on one side of the thus-obtained substrate, serving as the solid oxide layer, in a shape for forming the cathode layer; and a paste for forming the cathode layer is applied on the other side in a shape for forming the anode layer, followed by firing. Hence, a single piece of the solid oxide fuel cell can be obtained.

The solid oxide fuel cell can be further enhanced in durability. Examples of a method for enhancing durability include a method of embedding or fixing a metal mesh to a cathode layer and an anode layer in a fuel cell. In an example of the embedding method, the material (paste) for forming each of the layers is applied on the solid electrolyte layer; the metal mesh is embedded in the thus-applied material; and the entire structure is fired. In an example of the fixing method, the metal mesh may be affixed to the material for forming each of the layers, rather than completely embedding the same, and then sintered.

For the metal mesh, there is preferably employed a material exhibiting excellent heat resistance, as well as excellent balance in thermal expansion coefficient with the cathode layer and anode layer where the metal mesh is to be embedded or fixed. Specific examples of the metal mesh include platinum and a platinum-containing metal alloy, which are formed into meshes. Alternatively, there may be employed stainless steel of SUS 300 series (e.g., 304 or 316) or SUS 400 series (e.g., 430), which are advantageous also in terms of cost.

Instead of employing the metal mesh, metal wires may be embedded in or fixed to the anode layer and/or the cathode layer. The metal wires are formed from the same metal as that used for the metal mesh, and may be disposed in an arbitrary number and with an arbitrary placement. By means of embedding or fixing the metal meshes or metal wires to the anode layer and the cathode layer, the solid oxide substrate having cracks due to its thermal history, or the like, is reinforced so as to prevent disintegration into pieces. Furthermore, the metal meshes or the metal wires electrically connect the cracked portions.

Heretofore, the case where the solid oxide substrate is formed into the porous structure has been described. However, solid oxide structure having a closely-compacted structure can be employed in the fuel cell device. In this case, embedding or fixing the metal mesh or the metal wires to the cathode layer and the anode layer offer effective means for coping with, in particular, cracking due to a thermal history.

The metal mesh or the metal wires may be disposed in one or both of the anode layer and the cathode layer. In addition, the metal mesh and the metal wires may be disposed in combination. When the metal mesh or the metal wires are embedded at least in the anode layer, when cracking is produced due to a thermal history, power generation performance is not degraded, and generation of electric power can be continued. The power generation performance of the solid oxide fuel cell largely depends on the effective area of the anode layer serving as the fuel electrode. Accordingly, the metal mesh or the metal wires is desirably provided at least in the anode layer.

The solid oxide fuel cell configured as above is used as the fuel cell C of the solid oxide fuel cell device of the present embodiment. In the present embodiment, fuel components for partial oxidization (hereinafter called "partial oxidation fuel components") produced by flameless combustion based on catalytic oxidation, which enables combustion of fuel in a stabled condition, are utilized as fuel to be supplied to the anode layer 3 formed in the solid oxide fuel cell. The temperature of heat produced by the flameless combustion is approximately 300 to 600° C., which is the temperature level at which a solid oxide fuel cell device which directly utilizes a flame (hereinafter called a "direct-flame-type solid oxide fuel cell") can operate. Therefore, flameless combustion based on catalytic oxidation of fuel is appropriate as a fuel supply source for a solid oxide fuel cell, and, furthermore, as a drive heat source.

The flameless combustion based on catalytic oxidation will now be described. Metal catalysts for use in catalytic oxidation are broadly divided into catalysts based on precious metals, such as platinum and palladium; and catalysts based on base metals, such as manganese and iron. The precious metals have high activities to a variety of gas components. Therefore, platinum, in the form of a metal catalyst, is often employed for flameless combustion of fuel, as in the case of a heating appliance; a so-called "platinum pocket warmer." In this case, a catalytically-oxidizing member is formed from glass wool to which platinum is affixed.

When an organic liquid, such as benzine, ethyl alcohol, or white kerosene, or an organic gas, such as methane or propane, is added as fuel to the catalytically-oxidizing member, the fuel $C_xH_yO_z$ reacts with oxygen $O_2$ at a low temperature level of approximately 300 to 600° C. by catalysis of platinum, thereby producing carbon dioxide $CO_2$ and water $H_2O$; that is, and oxidative destruction of the fuel is carried out. During the course of this oxidative destruction of the fuel, heat of reaction is released. It should be noted that the reaction of this oxidative destruction corresponds to the flameless combustion, and that the oxygen contributing to this reaction must be supplied from the outside of the catalytically-oxidizing member. In the case of a heating appliance, this heat of reaction serves as a heat source for heating the surroundings; and, furthermore, the heat assists evaporation of the fuel, thereby maintaining the oxidation catalysis.

Meanwhile, in the oxidation catalysis of the fuel by the catalytically-oxidizing member, when oxidative destruction is carried out, theoretically, all the fuel is to be split into carbon dioxide $CO_2$ and water $H_2O$. However, in actual reaction, because of efficiency in catalytic oxidation, high temperature, and the like, a portion of the fuel acts as partial oxidation fuel components including active species contributing to generation of electric power, and is released from the catalytically-oxidizing member. The partial oxidation fuel components can be utilized as fuel of the foregoing solid oxide fuel cell.

Meanwhile, the above description has explained the case where glass wool to which platinum is attached is employed as the catalytically-oxidizing member. However, the configuration of the catalytically-oxidizing member is not limited thereto, and can be configured from, in the place of the glass wool to which platinum is attached, a honeycomb-type member, a pellet-type member, a metal foamed member, or the like, so long as it is capable of ensuring a large SV value, is low in pressure loss, has a long useful life, is resistant to clogging, and the like.

When the anode layer of the foregoing solid oxide fuel cell is disposed above the thus-configured catalytically-oxidizing member spaced by a predetermined distance therefrom, the partial oxidation fuel components produced on the catalytically-oxidizing member are supplied to the anode layer; and the cathode layer formed on the opposite side is automatically exposed to the air, thereby being supplied with oxygen. At this time, when the anode layer is formed in conformance with the shape of an upper surface of the catalytically-oxidizing member, the partial oxidation fuel components are uniformly supplied over the entire surface of the anode layer, which is efficient.

Meanwhile, in a case where the catalytically-oxidizing member is housed in an open recess for fire (hereinafter called a "open fire recess") as in the case of the heating appliance, the catalytically-oxidizing member must be provided with oxygen which is required for an oxidation catalytic reaction. Therefore, the upper surface of the catalytically-oxidizing member and the anode layer are spaced apart by an appropriate distance rather than being brought into close contact. By virtue of this spaced arrangement, the air is distributed sufficiently, thereby enabling supply of oxygen to the catalytically-oxidizing member.

When a direct-flame-type solid oxide fuel cell is configured by means of combining such a catalytically-oxidizing member and the foregoing flat planar solid oxide fuel cell, the fuel cell device can continue to generate electric power not only while the device is fixed, but also while the same is carried on the road or while on the move, and the thus-generated electric power can be readily extracted. Next, an example of a solid oxide fuel cell device utilizing the catalytically-oxidizing member will be described.

EXAMPLE

Figure 1:
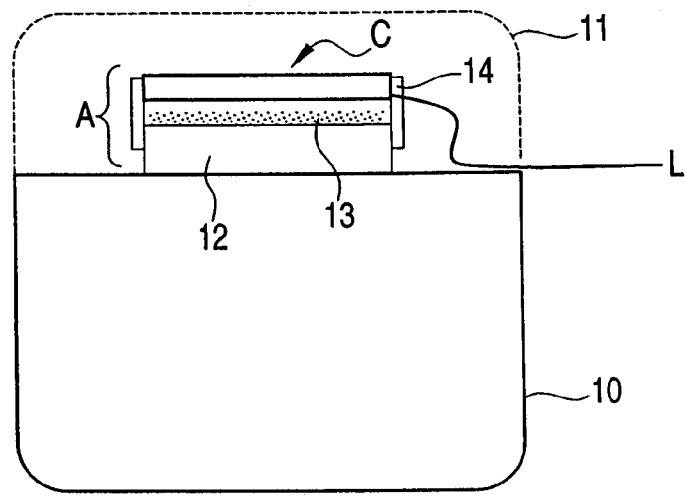
FIG. 1 is a view describing a schematic structure of a solid oxide fuel cell device which utilizes flameless combustion according to the invention.
Figure 2:
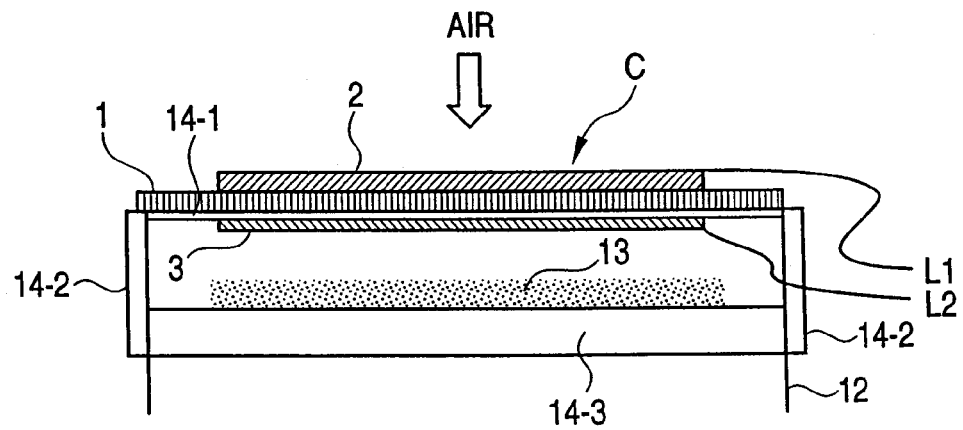
FIGS. 2A and 2B are enlarge views of the vicinities of a flameless combustion section for describing a detailed configuration of the solid oxide fuel cell device illustrated in FIG. 1.
Figure 2:
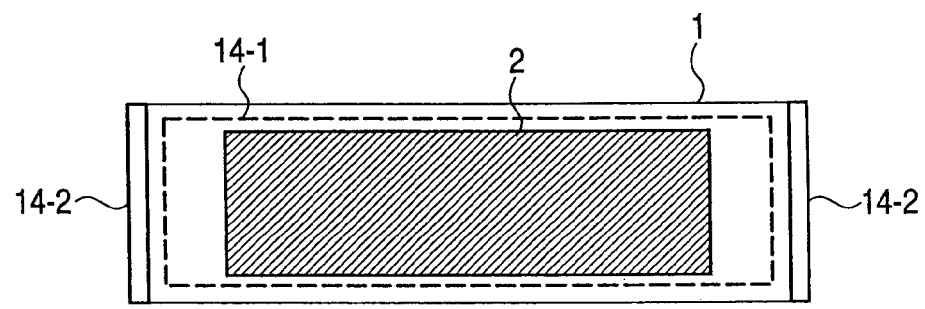

FIG. 1 illustrates an example of a direct-flame-type solid oxide fuel cell device which can supply fuel to a solid oxide fuel cell, and, in addition, which utilizes a catalytically-oxidizing member as a heat source for maintaining its operating temperature. The example illustrated in FIG. 1 utilizes a catalytically-oxidizing member provided in a platinum pocket warmer, which is a typical example of a heating appliance.

Generally, a portable-type platinum pocket warmer comprises a fuel storage container 10; an open fire recess A at an upper portion of the fuel storage container 10; a fuel supply port 12 through which fuel can be supplied from the fuel storage container 10; and a catalytically-oxidizing member 13 for catalyzing oxidation of the thus-supply fuel. The fuel supply port 12 and the catalytically-oxidizing member 13 are disposed in the open fire recess A. A protective cover 11 for covering the open fire recess A is attached after ignition of the fire, for ensuring safety required of a heating appliance. A plurality of air holes are formed in the protection cover 11 so as to supply the catalytically-oxidizing member 13 with oxygen. FIG. 1 depicts the protection cover 11 by means of a dotted line.

The present example adopts a configuration which enables attachment of the solid oxide fuel cell C to the open fire recess A in the platinum pocket warmer above the catalytically-oxidizing member 13 by means of a cell holder 14. This cell holder 14 is detachably attached to the fuel supply port 12. The electric power generated by the solid oxide fuel cell C can be extracted to the outside of the platinum pocket warmer via a lead wire L.

Next, FIGS. 2A and 2B illustrate enlarged views of the open fire recess A illustrated in FIG. 1. FIG. 2A is a side view of the fire open recess A, and FIG. 2B is a top view of the same. As illustrated in FIG. 2A, the catalytically-oxidizing member 13 is housed in a tip end portion of the fuel supply port 12, while projecting a short distance out of an upper portion of the tip end portion.

The solid oxide fuel cell C comprises the solid oxide substrate 1; and the cathode layer 2 and the anode layer 3 which are formed on the respective surfaces of the substrate. The solid oxide substrate 1 is formed into a flat planar shape of a size covering the entire opening of the fuel supply port 12. FIGS. 2A and 2B illustrate a case where the substrate 1 is rectangular. The anode layer 3 has a shape conforming to a spread face of the catalytically-oxidizing member 13. In FIGS. 2A and 2B, the spread face of the catalytically-oxidizing member 13 is rectangular. Accordingly, the anode layer 3 is also formed into a rectangular shape.

Meanwhile, the cathode layer 2 is placed on the side opposite the catalyst oxidant 13, and in a state of being directly exposed to air. Hence, the cathode layer 2 is supplied with oxygen from the air. The air is supplied by natural convection through the air holes in the protection cover 11. The lead wire L1 is connected to the cathode layer 2, and the lead wire L2 is connected to the anode layer 3. Hence, as illustrated in FIG. 1, the lead wires L1 and L2 serve as the lead wire L, through which generated electric power is extracted to the outside.

The solid oxide fuel cell C is detachably held on the fuel supply port 12 by means of the cell holder 14. The cell holder 14 comprises a cell-holding frame 14-1, support members 14-2, and a supply port engagement member 14-3, which are fixed to each other as illustrated in FIG. 2B. The cell-holding frame 14-1 is provided for mounting the solid oxide substrate 1 thereon. An opening is formed in the cell-holding frame 14-1 so that the anode layer 3 opposes the catalytically-oxidizing member 13.

The support members 14-2 are provided for holding the solid oxide fuel cell C in a state that the fuel cell C maintains an appropriate clearance from the catalytic oxide 13. The supply port engagement member 14-3 has a function of detachably engaging with the fuel supply port 12. The support members 14-2 are fixed to the supply port engagement member 14-3.

The solid oxide fuel cell device of the present example can be configured as described above. However, for actually activating the solid oxide fuel cell device, first, the open fire recess A is removed from the fuel storage container 10; and an appropriate quantity of fuel; e.g., benzine, is poured into the fuel storage container 10 via the fuel supply port 12. Subsequently, after attachment of the open fire recess A, fire is applied to the catalytically-oxidizing member 13. The catalytically-oxidizing member 13 is supplied with evaporated benzine from within the fuel storage container 10, and, furthermore, with air from the outside of the pocket warmer.

In the catalytically-oxidizing member 13, the evaporated benzine is subjected to catalytic oxidation with oxygen in the air, and produces heat by the oxidation catalysis. The heat is supplied to the solid oxide fuel cell C, and raises the temperature to the operating temperature. Meanwhile, the remaining benzine not having been converted into carbon dioxide and water in the oxidation catalysis is supplied to the anode layer 3 as the partial oxidation fuel component. When the heat and the partial oxidation fuel components are supplied to the solid oxide fuel cell C from the catalytically-oxidizing member 13 in this manner, the cathode layer 2 is supplied with oxygen from the air. Hence, an electromotive force can be obtained via the lead wires L1 and L2.

Meanwhile, a state in which the solid oxide fuel cell C is in contact with the catalytically-oxidizing member 13 is optimum for efficient transfer of the heat produced on the catalytically-oxidizing member 13 to the solid oxide fuel cell C. However, in this contact state, oxygen required for the oxidation catalysis on the catalytically-oxidizing member 13 cannot be supplied sufficiently. To this end, the clearance between the solid oxide fuel cell C and the catalytically-oxidizing member 13 must be maintained at a distance at which thermal conduction from the catalytically-oxidizing member 13 is effectively performed, and at the same time, at which the catalytically-oxidizing member 13 is sufficiently supplied with the air. Therefore, the length of the support members 14-2 of the cell holder 14 are adjusted so as to space the solid oxide fuel cell C and the catalytically-oxidizing member 13 with an appropriate clearance.

In the solid oxide fuel cell C employed in the above-described example is configured such that a single piece of the cathode layer 2 is formed on one surface of the solid oxide fuel cell C, and a single piece of the anode layer 3 on the opposite surface, thereby forming a single fuel cell. However, as illustrated in FIG. 3, a plurality of fuel cells may be formed as an entire fuel cell device by means of forming a plurality of cathode layers 2-1 to 2-4 and a plurality of anode layers 3-1 to 3-4 (not shown) on corresponding surfaces of a flat planar solid oxide substrate 1. FIG. 3 illustrates an example where four fuel cells are formed.

Figure 3:
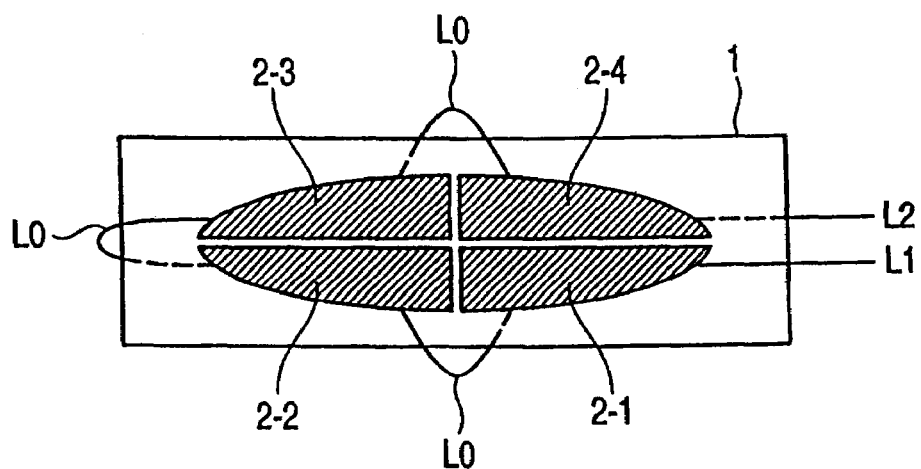
FIG. 3 is a view describing a modification of a solid oxide fuel cell to be employed in a solid oxide fuel cell device.
Figure 4:
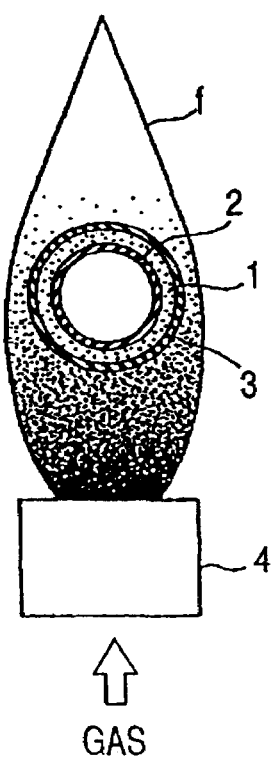
FIG. 4 is a view describing a configuration of a tubular solid oxide fuel cell device which uses a flame according to the related art.

FIG. 3 shows that the four cathode layers 2-1 to 2-4 are formed on one surface of the substrate 1; and the four anode layers 3-1 to 3-4 (not shown) on the opposite surface. For instance, a single fuel cell is formed from the cathode layer 2-1 and the anode layer 3-1; and a plurality of solid oxide fuel cells are formed from the cathode layers and the anode layers, which are paired layers facing each other, on a single solid oxide substrate. The lead wire L1 through which an electromotive force is to be extracted is connected to the cathode layer 2-1; and the lead wire L2 through which an electromotive force is to be extracted is connected to the anode layer 3-4. Furthermore, as illustrated in FIG. 3, the cathode layer 2-2 and the cathode layer 3-1 are electrically connected via a connecting wire L0. As the lead wires and the connecting wire, members made of platinum or a platinum-containing alloy, which are heat-resistant, are employed.

When the fuel undergoes flameless combustion in the catalytically-oxidizing member 13 below the four solid oxide fuel cells, and produces heat and the partial oxidant fuel components, the entire surfaces of the anode layers 3-1 to 3-4 are exposed thereto. Since the four fuel cells are directly connected via the connecting wires L0, an output of a magnitude equal to a total of the electromotive forces by the four fuel cells is obtained between the lead wire L1 and the lead wire L2.

As illustrated in FIG. 3, the anode layers 3-1 to 3-4 are formed into an elliptic shape in their entirety, and are separated from each other. FIG. 3 illustrates a case where the electrode layers are formed into an elliptic shape in their entirety. However, as described above, the electrode layers may be rectangular in their entirety; and an advantage in view of efficiency can be yielded when the shape of the electrode layers in their entirety is determined so as to conform to the upper shape of the catalytically-oxidizing member 13. In addition, when the solid oxide substrate has a flat planar shape, the cathode layer side can be readily brought into an oxygen-rich state; and the cathode layer side is exposed to air, thereby facilitating utilization of oxygen in the air, which enables maintenance of the oxygen-rich state.

By means of the above, there can be fabricated a solid oxide fuel cell which is configured such that a plurality of fuel cells are formed on a single solid oxide substrate; anode layers formed on a single surface can be subjected to flameless combustion; and air is supplied to the cathode layer side independently for the respective cathode layers. In the solid oxide fuel cell illustrated in FIG. 3, the connecting wire L0 connects between the cathode layer and the anode layer while being routed outside the solid oxide substrate 1 so as to connect the four fuel cells in series. Since the connecting wire L0 has a shape extending outside the solid oxide substrate, in some cases, the connecting wire L0 constitutes an obstruction. To this end, a via may be provided at a portion of the solid oxide substrate 1 where neither the cathode layer nor the anode layer is formed, thereby connecting the cathode layer and the anode layer by way of the via.

A specific example of electric power generation by the solid oxide fuel cell device of the present example will now be described. The open fire recess A having been originally provided in a platinum pocket warmer employed in the example was modified so as to have the configuration illustrated in FIG. 1 for facilitating installation of the solid oxide fuel cell. The solid oxide fuel cell was placed so as to oppose the catalytically-oxidizing member mounted in the platinum pocket warmer while being spaced by an appropriate clearance. When the platinum pocket warmer was operated, the temperature of the catalytically-oxidizing member was ascertained to have raised to approximately 300 to 600° C., reaching a temperature level at which the direct-flame-type solid oxide fuel cell can operate.

Here, the solid oxide fuel cell employed in the example will be described. The solid oxide substrate is made of SDC (samaria-doped ceria); the cathode layer is made of 50% by weight SSC (samaritium strontium cobalt) and 50% by weight SDC; and the anode layer is made of 5% by weight $Rh_2O_3$, 75% by weight 8 mol Li—NiO, and 20% by weight SDC.

The table below shows electromotive forces generated by the solid oxide fuel cell, which were measured with varying the distance between the solid oxide fuel cell and the catalytically-oxidizing member. As to the electromotive forces produced by the fuel cell, it is measured in the open-circuit voltages.

| Distance | Temperature beneath Cell | Temperature of Upper Surface of Cell | Electromotive Force of Cell |
|---|---|---|---|
| 10 mm | 520 to 540° C. | 150 to 160° C. | 0.16 V |
| 5 mm | 420 to 440° C. | 230 to 240° C. | 0.21 V |
| 2 mm | 330 to 340° C. | 240 to 250° C. | 0.22 V |
| 0 mm | 330° C. | 200 to 210° C. | 0.24 V |

The values of the thus-generated electromotive forces remained the same even after several hours, whereby the power generation was ascertained to be stable. As is apparent from the above result, the electromotive force produced by the cell was 0.24 V maximum. However, this maximum value was obtained where the distance was 0 mm, and this indicates that the fuel cell and the catalyst oxidant were in a contact state, and supply of oxygen to the catalyst oxidant fell short, thereby inhibiting catalytic oxidation of the fuel. This lowering of temperature is not appropriate for a heating appliance. Accordingly, the distance between the fuel cell and the catalytically-oxidizing member is appropriately selected in accordance with a type of the fuel, and a type and an amount of supported catalyst.

In the foregoing example, benzine was employed as the fuel. However, when the electromotive force produced by the fuel cell was measured while ethanol was used as the fuel, the temperature of the cell was approximately 380 to 400° C. when the distance between the fuel cell and the catalytically-oxidizing member was 10 mm, and the electromotive force at this time measured 0.21 V.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. A solid oxide fuel cell device comprising:
a solid oxide fuel cell having a planar solid oxide substrate,
a cathode electrode layer formed on a first surface of the substrate,
an anode electrode layer formed on a second surface of the substrate opposite to the first surface thereof; and
a catalytically-oxidizing member which is disposed below the solid oxide fuel cell, and to which fuel is to be supplied,
wherein an oxidation fuel component of the fuel is supplied to the anode electrode layer, said oxidation fuel component being produced from the fuel through the catalytically-oxidizing member, and
air is supplied to the cathode electrode layer, by which an electric power is generated, and
the catalytically-oxidizing member is provided at an exit of fuel of a fuel storage container in a heating appliance, and serves as a heat source of the heating appliance.

2. The solid oxide fuel cell device defined in claim 1, wherein the solid oxide fuel cell is disposed to have a gap from the catalytically-oxidizing member.

3. The solid oxide fuel cell device defined in claim 1, wherein the fuel to be supplied to the catalytically-oxidizing member is organic liquid or organic gas accumulated in the fuel storage container.

4. The solid oxide fuel cell device defined in claim 3, wherein the organic liquid is any of benzine, ethanol, and white kerosene.

5. The solid oxide fuel cell device defined in claim 1, wherein each thickness of the cathode electrode and the anode electrode is formed in a range from 0.1 mm to 0.3 mm, while that of the solid oxide substrate is formed in a range from 0.1 mm to 0.3 mm.

6. The solid oxide fuel cell device defined in claim 1, wherein the solid oxide fuel cell has a plurality of cathode electrode layers formed on the one surface of the solid oxide substrate, and a plurality of anode electrode layers formed on the opposite surface of the solid oxide substrate; and a plurality of fuel cells are formed from the anode electrode layers and the cathode electrode layers which oppose each other across the solid oxide substrate.

* * * * *